Figure 1:
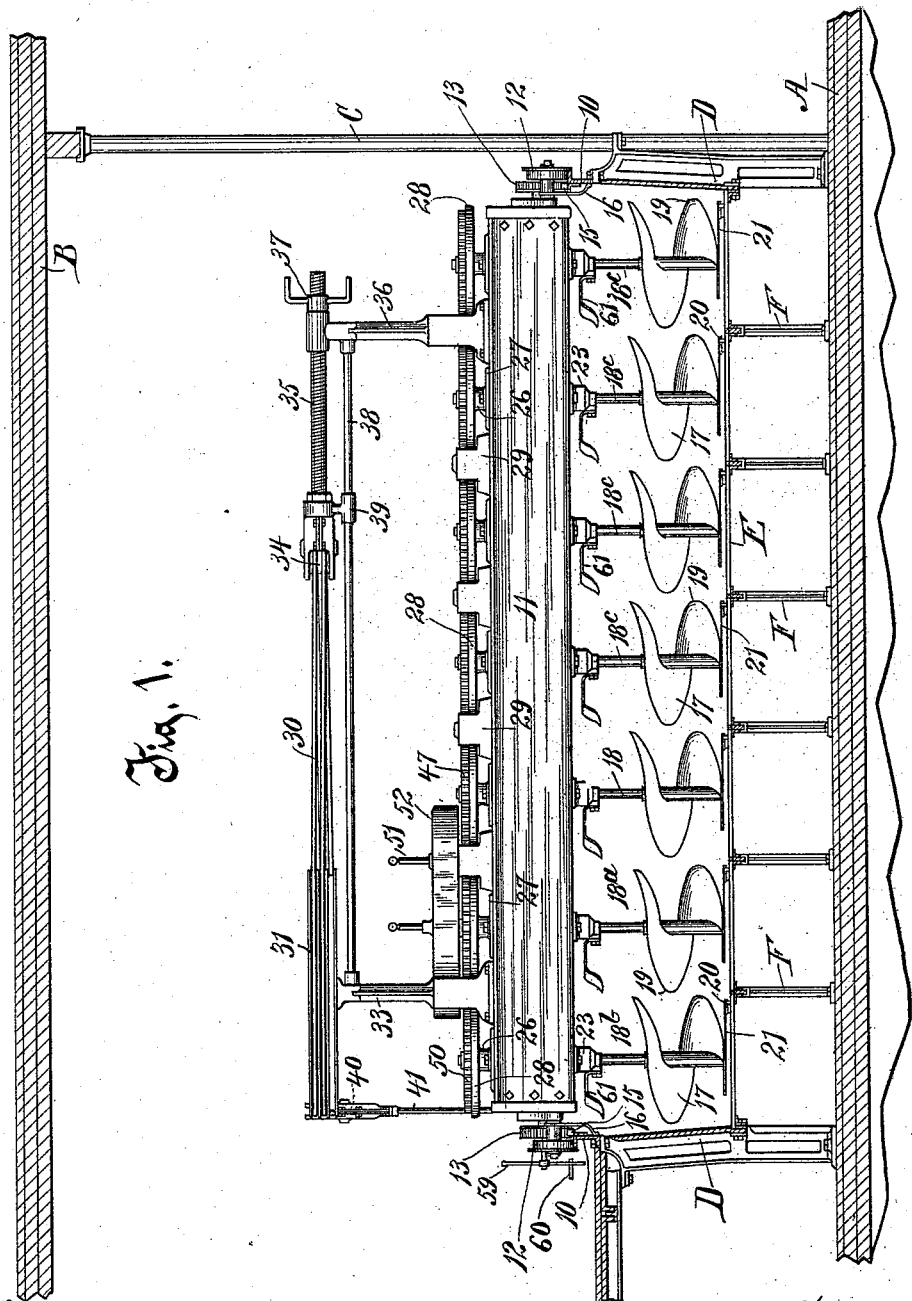

(No Model.) 5 Sheets—Sheet 1.

J. F. DORNFELD.
MALT STIRRER.

No. 532,542. Patented Jan. 15, 1895.

Witnesses:
A. H. Keeney
Anna O. Faust

Inventor.
John F. Dornfeld
By Benedict & Morsell
Attorneys.

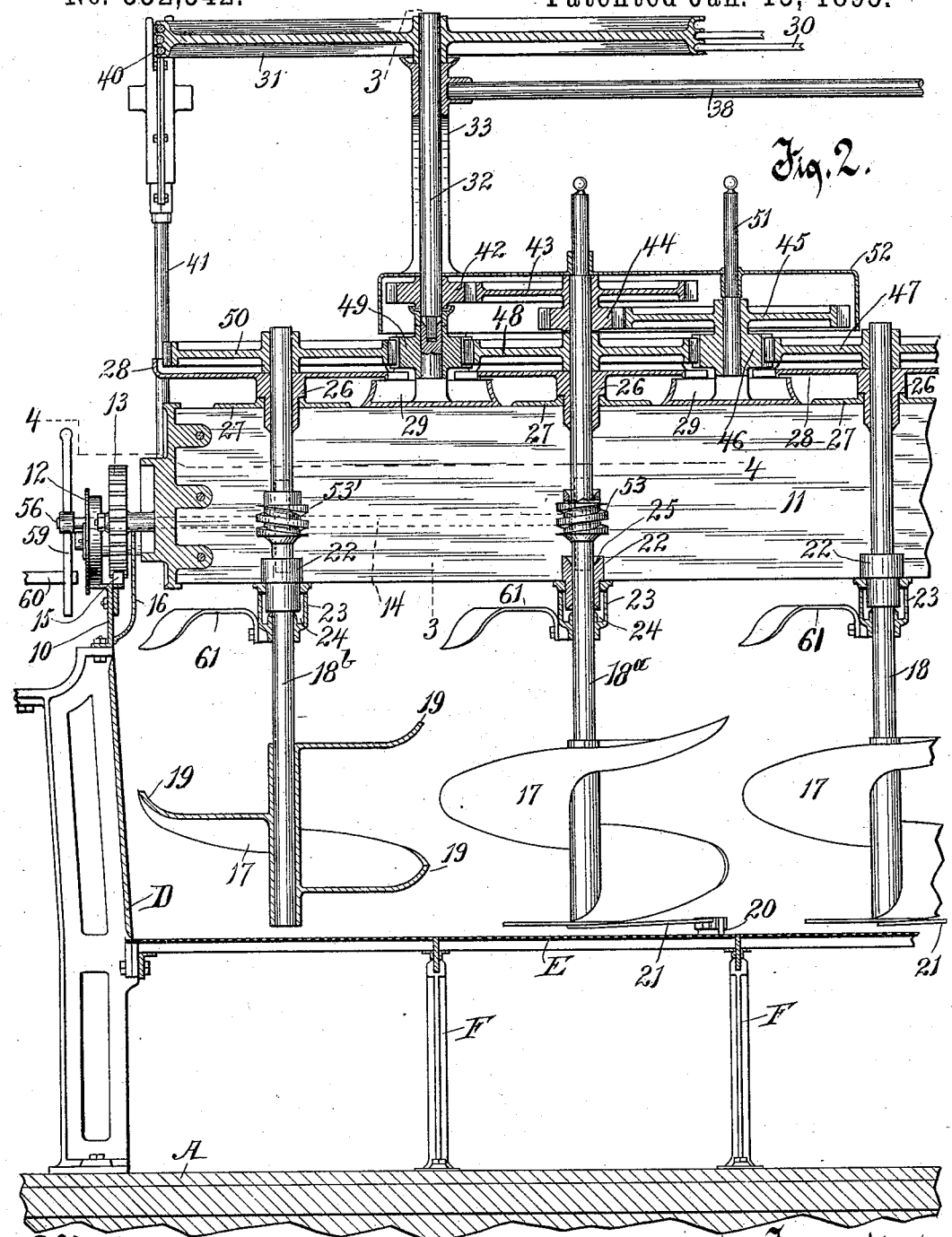

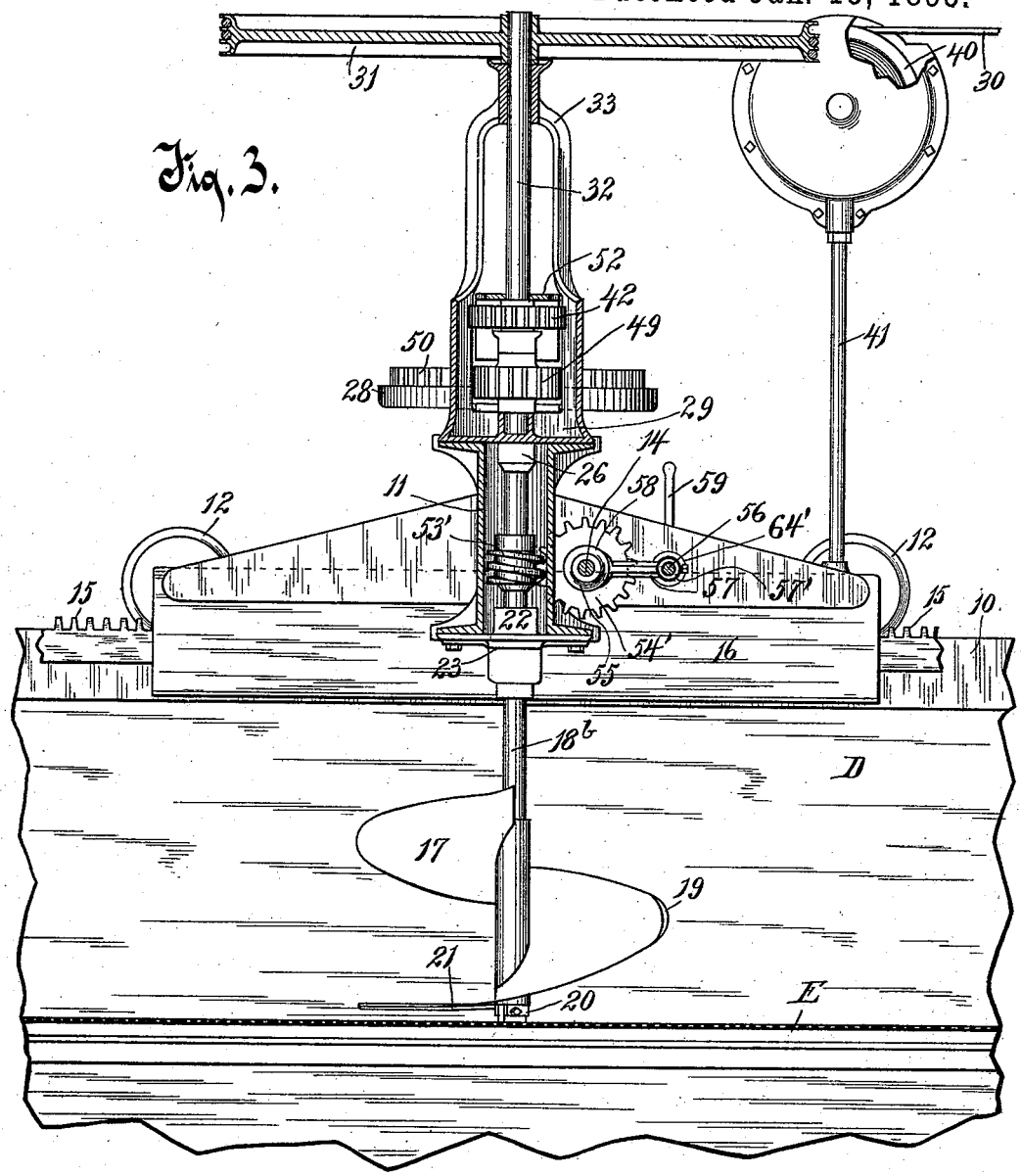

(No Model.) 5 Sheets—Sheet 4.
J. F. DORNFELD.
MALT STIRRER.
No. 532,542. Patented Jan. 15, 1895.
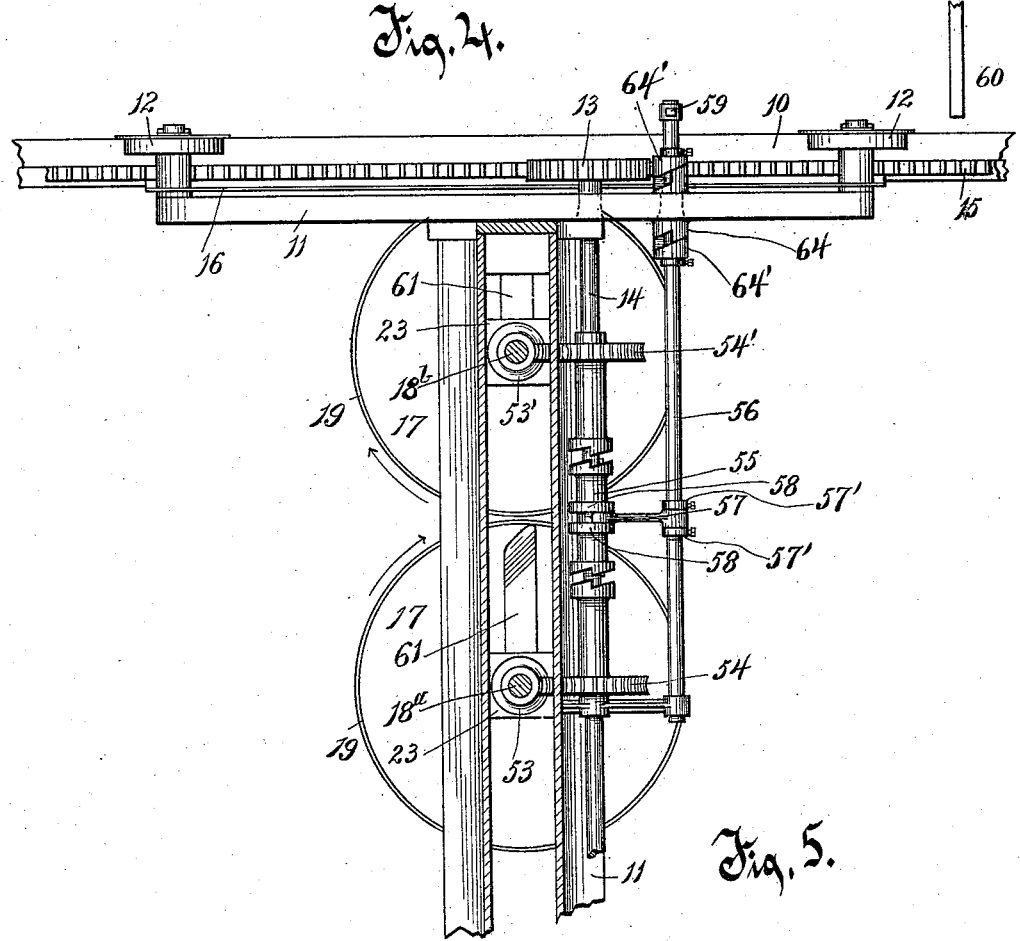
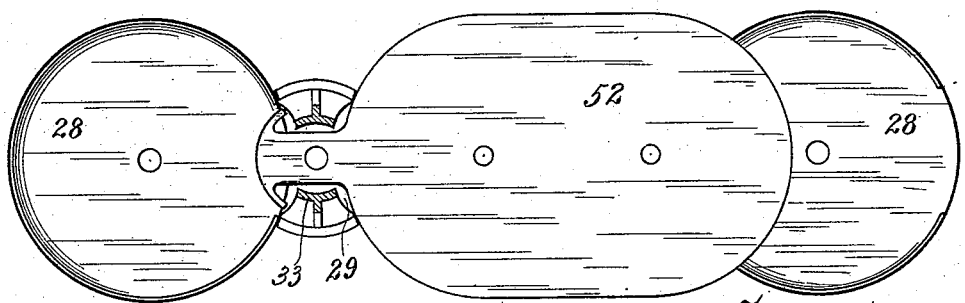
Witnesses.
Inventor.
John F. Dornfeld
By Benedict Morsell
Attorneys.

(No Model.) 5 Sheets—Sheet 5.
J. F. DORNFELD.
MALT STIRRER.
No. 532,542. Patented Jan. 15, 1895.
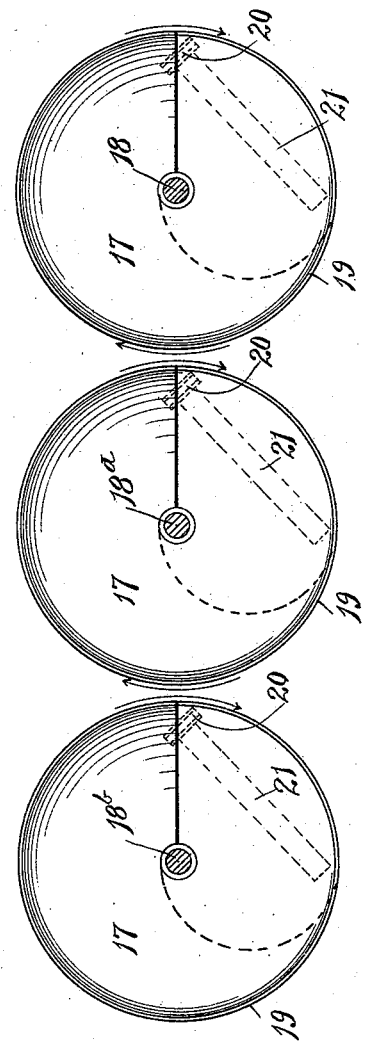
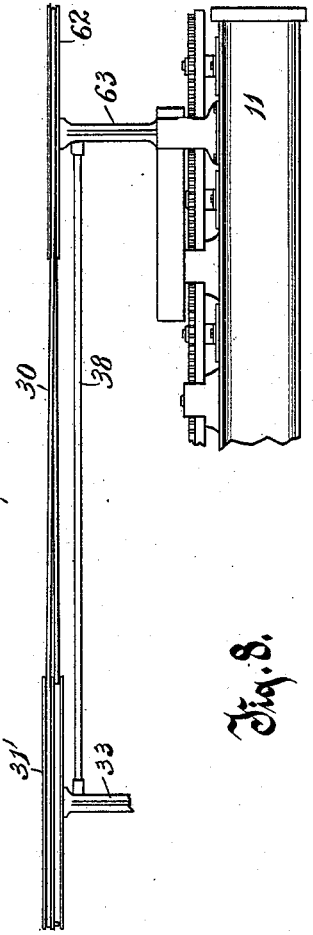
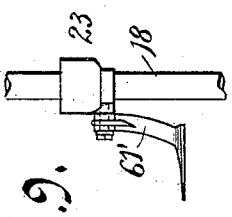
Witnesses.
Inventor
John F. Dornfeld
By Benedict & Morsell
Attorneys.

UNITED STATES PATENT OFFICE.

JOHN F. DORNFELD, OF CHICAGO, ILLINOIS.

MALT-STIRRER.

SPECIFICATION forming part of Letters Patent No. 532,542, dated January 15, 1895.

Application filed December 30, 1893. Serial No. 495,212. (No model.)

*To all whom it may concern:*

Be it known that I, JOHN F. DORNFELD, of Chicago, in the county of Cook and State of Illinois, have invented a new and useful Improvement in Malt Stirring and Aerating Apparatus, of which the following is a description, reference being had to the accompanying drawings, which are a part of this specification.

My invention is of improvements in apparatus for stirring and lifting and thereby breaking up and separating the mass of grain or malt on a malting floor, permitting air either by natural action or by artificial means to come into contact with all portions of the flooring of grain in the process of malting.

The object of the invention is to provide a strong and durable apparatus, comparatively simple in construction, easily manipulated, and largely automatic in operation, which apparatus is better adapted for stirring, lifting and opening up the malt than those apparatuses heretofore in use, and mechanism therewith which is especially and peculiarly well adapted for driving the stirring apparatus, and for use in connection with a malting floor.

The invention consists of the apparatus and its several parts or their equivalents, hereinafter described and claimed.

Figure 1, is an elevation of the carriage and the malt stirring devices mounted thereon, in connection with so much of the room and supporting devices, mostly in section, as are necessary to illustrate the relations and functions of the stirring apparatus. Fig. 2, is an enlarged view of a fragment of the malting floor, and of the malt stirring devices, and of the mechanism for driving them, many of the parts being in vertical section. Fig. 3, is a transverse, vertical section of the carriage and fragment of the floor and carriage support, taken on line 3—3 of Fig. 2 looking toward the left, parts being broken away for convenience of illustration. Fig. 4, is a section and plan, taken on line 4—4 of Fig. 2, looking downwardly. Fig. 5, is a plan looking downwardly, of devices shown in elevation in Fig. 1 and in vertical section in Fig. 2. Fig. 6, is a plan of the vertically disposed spiral stirring shovels, the motion of the shovels being indicated by arrows alongside thereof. Fig. 7, shows a form of device for driving the shovels at the farther extremity of the carriage, when it is not convenient or satisfactory to transmit motion thereto from the shaft of the shovel to which the initial power is applied. Fig. 8, is a modified form of scraper or floor clearing device. Fig. 9, is a modified form of the hook or rake.

Referring to the drawings, A is the floor and B the ceiling of the room in which the malting floor and stirring apparatus are located.

C is a column supporting the ceiling.

D D are low walls extending across the malting room from side to side or from end to end, and the malting floor E is supported on these walls and the columns F, at a distance above the floor A. Above the malting floor F the walls D are preferably flared or inclined outwardly upwardly slightly.

A track consisting of the rails 10, 10 is fixed horizontally on the top of the walls D. A carriage 11 above the malting floor extends transversely across the floor and is provided with wheels 12, 12 mounted on fixed axles, which wheels travel on the track 10 and support the carriage thereon. Gear wheels 13, 13 fixed on a shaft 14 mesh with racks 15, 15 fixed on the track 10. The shaft 14 is journaled in the carriage 11. By these means the carriage is supported and driven slowly back and forth across the room over the malting floor. Sheet metal guards 16, 16 secured to the carriage, conveniently by means of the axles of the wheels 12, on the inside of the gear wheels 13 depend therefrom and are turned outwardly bearing loosely against the webs of the rails 10, and are adapted to prevent the malt from getting into the racks 15 when being stirred, and to catch and prevent oil dripping from the wheels 13, falling on to the malt.

For lifting and stirring the malt on the malting floor E, there is a series of spiral shovels 17 fixed on the vertically disposed shafts 18 (referring collectively to the shafts marked on the drawings 18, 18$^a$, 18$^b$ and 18$^c$) journaled and supported on the carriage 11. These shovels are located along the carriage 11 at such distance apart and in such manner as to sweep and raise all the malt from the malting floor, during the progress of the carriage across the floor from one extremity to the other. The spirals 17 are each preferably constructed integrally or in sections forming a continuous blade without apertures, the outer portion of which spiral near its perimeter is turned up as seen at 19 (Fig. 2), thus forming a trough, in which the malt is carried upwardly by the rotation of the spiral and the pressure of the mass behind it in connection with the forward movement of the carriage over the floor, until it is discharged at the top and rear of the shovel. This insures the complete lifting and breaking up of the mass of malt, which would not be accomplished if the blades were horizontal and the malt when lifted from the floor by the shovels could readily escape therefrom laterally. These shovels 17 are so mounted on the depending shafts 18, 18$^a$, 18$^b$, 18$^c$ as to sweep over the floor E quite near thereto, but as a little clearance is always necessary, and as the malting floor is liable to become somewhat uneven, a scraper 20 consisting ordinarily of a suitable head with an interposed sheet or block of rubber adapted to bear against the floor, is secured to the shovel 17 by an elastic and resilient arm 21. The scraper 20 is so disposed, that being held to the floor by the spring 21 it scrapes the entire surface of the floor in the path of the shovel over the floor from one end of the room to the other, as the shovel is revolved and the carriage is moved forward.

The shafts 18, 18$^a$, 18$^b$, 18$^c$ are journaled in the carriage preferably by means of two series of removable journal blocks, the lower series of which blocks 22, 22 are supported in the lower portion of the carriage frame, by being let into apertures therefor in the bottom of the frame and being supported thereon by shoulders on the blocks. The blocks extend down into cup shaped collars 23, 23 secured to the shafts. These collars are provided with an annular groove 24 adapted to catch the oil that escapes from the bearing of the shafts 18, 18$^a$, 18$^b$, 18$^c$ in the blocks 22. The blocks 22 have a cup shaped upper extremity 25, adapted to receive the oil that runs down the shaft from above, and for lubricating purposes. The upper series of journal blocks 26 are let into and are supported removably on suitable plates 27 therefor fixed on the upper part of the carriage. The top of each of these blocks 26 is expanded into a cup 28 of slighlty greater diameter than the cog wheel above it, and is adapted to catch oil dripping from the wheels above and discharge it through a suitable aperture therefor into the oil receptacle 29, fixed on the carriage.

For rotating the shafts 18, 18$^a$, 18$^b$, 18$^c$ and therefrom driving the carriage, an endless driven cable 30 located above and generally in the direction of the travel of the carriage over the malting floor, runs on the pulley 31, which pulley is fixed on the arbor 32 journaled in the upper and lower parts of the furcate standard 33, which standard is fixed on the carriage frame. The cable 30 is also carried around an idle pulley 34, which is adjustable toward and from the pulley 31 by means of the screw 35 secured to the block of the pulley revolubly, which screw passes loosely through the upper portion of the standard 36, and is provided with a winged nut 37 turning thereon against the standard. The standard 36 is fixed on the carriage, and a rod 38 extending from the standard 36 to the standard 33 serves to brace and strengthen the standards, and as a guide for the pulley 34 which is loosely mounted thereon by means of a runner 39, fixed to the sheave block. By means of the adjustable sheave 34, the tension of the cable 30 can be adjusted as necessary. An idle pulley 40 mounted on an upright 41 fixed in the carriage, is disposed vertically near to and tangentially of the pulley 31, the top of the pulley 40 being substantially flush with and in line of the lateral edge of the pulley 31, said pulley 40 being adapted to support and guide the cable, on that side of the pulley 31 at which the cable approaches the pulley and where slack is likely to occur.

It will be understood that the malting floor is in a room of considerable size having no partitions over the floor, and that the carriage 11 reciprocates in this room over the floor, and that the shovels in the carriage revolve adjacent to and without partition or other fixed obstruction between each other, lifting the malt from the floor and at the same time breaking the mass up and separating it so that its interior and under portions are quite thoroughly exposed to the air whereby its temperature and condition are satisfactorily modified.

For accomplishing the most successful results in stirring and breaking up the mass of malt, it is desirable that the spiral shovels should all rotate in the same direction, so that the adjacent edges of the shovels shall pass each other moving in opposite directions, whereby, by the cross strain and resistance of the shovels against the malt being lifted, the considerable elevation and thorough tearing apart of the mass, are secured. Another desirable result of this motion of the spiral shovels, in connection with a carriage reciprocative over the malting floor, is that the malt is more evenly distributed over the floor behind the carriage than it is where the shovels revolve in opposite directions. Where shovels revolve in opposite directions, the adjacent edges pass each other in the same direction, and thereby, as will be readily understood, the combined effort of the adjacent shovels is to carry the malt toward the front at those adjacent edges that move toward the front and thence laterally, while the adjacent edges that move toward the rear will unitedly carry an increased amount of the malt to the rear and deposit it in a ridge following the carriage. Also the slight ridges of malt left behind the carriage in my apparatus, are recurrently shifted laterally by the shovels moved reciprocatingly over the floor. This result is not accomplished so completely or satisfactorily by shovels revolving in opposite directions, as will be readily seen by any malster, and as can be understood by all with observation. For the purpose of thus driving the shovels, motion is communicated thereto from the driven arbor 32, as follows: A pinion 42 (Fig. 2) fixed on the arbor 32 meshes with the loose wheel 43, and a pinion 44 rigid on the hub of the wheel 43 meshes with the loose wheel 45, and a pinion 46 rigid on the hub of the wheel 45 meshes with wheels 47 and 48 fixed respectively on the shafts 18 and 18$^a$. A loose pinion 49 meshes with the wheel 48 and with the wheel 50 fixed on the shaft 18$^b$. The wheel 43 is loose on the shaft 18$^a$, and the wheel 45 is loose on a pin 51 fixed in the carriage frame. The pinion 49 is loose about the lower fixed journal block of the arbor 32. Motion is transmitted from the shaft 18 to the shaft 18$^c$ (at the right thereof in Fig. 1) by loose pinions interposed between cog wheels on the several shafts. The pinions are partially inclosed by cases, which in their lower portions become the oil receptacles 29. These oil receptacles as before stated are adapted to receive the oil caught and discharged by the cups 28. A removable cap 52 is placed over a portion of the gearing to protect it.

For transmitting motion, which must be very slow, from the rapidly running shaft 18$^a$ or 18$^b$ to the carriage, for reciprocating it over the floor, reversely threaded worms 53, 53' are fixed on the shafts 18$^a$ and 18$^b$ respectively (Fig. 2), which worms mesh respectively with the worm wheels 54, 54' loose on the shaft 14 (Figs. 3 and 4). A shifting clutch 55 splined on the shaft 14 is adapted to connect the shaft 14 operatively to one or the other of the shafts 18$^a$ or 18$^b$, thereby providing for running the carriage in one direction or the other over the floor, by means of the same constant motion of the cable 30, as desired. A shifting device, for automatically shifting the clutch 55, consists of the rock shaft 56 having revoluble and endwise movement in bearings therefor in the carriage frame. One of these bearings 64 is provided with annular cam faces reversely disposed at its two extremities, and complementary cam collars 64' 64' secured adjustably to the rock-shaft are so arranged with reference to the bearing 64 as by the limited rotation of the shaft to move it endwise. The rock shaft is provided with an arm 57 revolubly loose on the shaft, but held against movement endwise thereon by the collars 57' 57', the furcate extremity of which arm rides in an annular groove between collars 58 on the clutch 55, and is adapted to shift the clutch by the rocking of the shaft. A crank or handle 59 fixed on the rock shaft 56, is adapted to strike a stop 60, one stop being located in the path of the crank, near each end of the floor, whereby as the carriage reaches these points the rock shaft is tripped and the motion of the carriage is reversed. If required at any time the clutch 55 can be shifted by the attendant by hand by means of the hand lever or crank 59.

It will be understood that as the carriage travels back and forth over the malting floor, the shovels will plow into the mass of malt in front and elevate it, and discharge it from the top of the shovels to the rear. When the grain has sprouted considerably, it becomes a spongy and greatly expanded mass, that, being lifted by the shovels, is liable to be thrown up against the carriage, and to obviate this a hook or rake 61 is provided above each shovel and below the carriage, which being mounted on the shaft sweeps around as the shaft revolves, and is adapted to engage the mass of malt and rake it down thereby preventing its contacting with the carriage.

The rake consists of an arm secured to, and projecting laterally from the collar 23 and a tooth or blade projecting obliquely downwardly from the arm over the spiral shovel, with which it revolves.

If the malting floor is quite wide and the carriage carries a large number of shovels it may be desirable to drive the shovels directly from the cable, at both ends of the carriage. For this purpose a pulley 62 (Fig. 7) is mounted on an arbor journaled in a standard 63, similar to the standard 33, fixed on the other end of the carriage, and the pulley 62 being geared to a shovel shaft or shafts, in substantially the same manner that the arbor 32 is geared to the shafts at the other extremity of the carriage, the cable 30 is run from the pulley 31' (corresponding to the pulley 31 in the other form of device) on to the pulley 62 and the pulley is driven thereby.

In Fig. 8 the scraper 20 is attached to the shovel 17, not by a spring, as in the other form of device, but by an arm 21' hinged to the shovel, so that the scraper, which is of considerable weight, is free to follow the inequalities of the floor, and is held thereto by gravity. In this case the action of gravity is the equivalent of the spring to hold the scraper actively to the floor.

In Fig. 9 a rake 61' is shown which instead of being held rigidly in horizontal position of the shaft, as the rake 61 is, is pivoted on the collar 23 and hangs therefrom above the shovel, and is adapted to swing up or down, thus adapting it to engage with a more or less thick mess of malt above the shovel.

Having thus described my invention, what I claim, and desire to secure by Letters Patent, is—

1. In a malt stirring apparatus, the combination with a carriage reciprocative over the malting floor, and vertically disposed spiral shovels depending from and revoluble in the carriage, of rakes attached to the shafts and projecting therefrom over the shovels, adapted to keep down the malt above the shovels and prevent it from being carried up against the carriage, substantially as described.

2. In a malt stirring apparatus, walls alongside the malting floor, rails and racks on the walls, a carriage traveling on the rails and driven by wheels meshing with the racks on the walls, and guards secured to the carriage on the inside of and below said wheels and bearing movably against the rails or the walls, adapted to protect the racks from the malt and the malt from oil from the wheels, substantially as described.

3. In the carriage of a malt-stirring apparatus, a plurality of vertically disposed revolving shovel-shafts provided with cog wheels thereon, pinions intermediate and meshing with the wheels on the shovel-shafts, journal blocks in which the shovel shafts are suspended, said blocks being expanded at their tops into oil cups below and about the wheels thereon the sides of said cups being cut away to permit of the meshing of the pinions with the wheels and to permit the oil-drip to be discharged laterally therefrom, and oil receptacles on the carriage below the oil cups adapted to catch the drip therefrom, substantially as described.

4. The combination with an endless cable running in one direction over a malting floor, of a carriage reciprocative over said floor, a pulley mounted horizontally on said carriage on which said cable runs and by which the pulley is driven, and an idle vertical pulley 40 mounted on the carriage at a tangent to the driven pulley and in the line of the general direction of the cable on that side of the driven pulley at which the slack in the cable occurs, substantially as described.

5. The combination with the reciprocative carriage of a malt stirring apparatus, of a horizontally disposed driving pulley mounted thereon, a driving cable running on the pulley, and specific devices for controlling the tension of the cable consisting of an idle pulley 34 on which the cable runs from the driving pulley, a horizontal guide rod on which a runner fixed in the sheave block travels, a screw revoluble in the sheave block and loose in a standard fixed on the carriage, and a nut turning on the screw against the standard, substantially as described.

6. The combination with a reciprocative carriage in a malt stirring apparatus, and a vertically disposed revolving shaft therein provided with a worm thereon, of a horizontal shaft journaled in the carriage and provided with cog wheels meshing with a horizontal rack on the fixed support of the carriage, a worm wheel loose on the horizontal shaft gearing with the worm, and a clutch on the horizontal shaft for locking the worm wheel to the shaft, substantially as described.

7. The combination with a reciprocative carriage in a malt stirring apparatus, and vertically disposed shafts revolving in the same direction in the carriage, said shafts being provided with reversely screw-threaded worms thereon, of a horizontal shaft journaled in the carriage provided with cog wheels meshing with a horizontal rack on the fixed support of the carriage, worm wheels loose on the horizontal shaft gearing with the worms on the vertical shafts, a clutch splined on the horizontal shaft between the worm wheels, a rock-shaft journaled in the carriage provided with means substantially as described for shifting the clutch on the horizontal shaft.

In testimony whereof I affix my signature in presence of two witnesses.

JOHN F. DORNFELD.

Witnesses:
  H. B. MEADER,
  C. C. PALMER.